(12) United States Patent
Hayakawa

(10) Patent No.: US 6,728,033 B2
(45) Date of Patent: Apr. 27, 2004

(54) IMAGE STABILIZING OPTICAL LENS DEVICE WITH DECENTERING OF LENS SUB-UNIT

(75) Inventor: Shingo Hayakawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/098,448

(22) Filed: Mar. 18, 2002

(65) Prior Publication Data

US 2002/0126383 A1 Sep. 12, 2002

Related U.S. Application Data

(62) Division of application No. 08/638,581, filed on Apr. 29, 1996, now Pat. No. 6,384,975.

(30) Foreign Application Priority Data

May 10, 1995 (JP) .............................................. 7/136099

(51) Int. Cl.$^7$ .............................................. G02B 27/64
(52) U.S. Cl. .......................... 359/557; 359/786; 396/55
(58) Field of Search ................................ 359/554, 557, 359/689, 690, 745, 748, 749, 753, 785, 786, 813, 688; 396/52, 55

(56) References Cited

U.S. PATENT DOCUMENTS

| 4,491,395 A | 1/1985 | Okudaira .................... 359/688 |
| 4,852,984 A | 8/1989 | Takahashi et al. .......... 359/786 |
| 4,927,250 A | 5/1990 | Suda |
| 4,974,950 A | 12/1990 | Yamazaki et al. |
| 4,978,205 A | 12/1990 | Sato ............................ 359/557 |
| 5,000,549 A | 3/1991 | Yamazaki |
| 5,249,079 A | 9/1993 | Umeda ........................ 359/554 |
| 5,303,087 A | 4/1994 | Hayakawa et al. ......... 359/708 |
| 5,442,486 A * | 8/1995 | Sato ............................ 359/557 |
| 5,490,014 A | 2/1996 | Suzuki ........................ 359/745 |
| 5,502,594 A * | 3/1996 | Suzuki et al. ............... 359/557 |
| 5,579,160 A | 11/1996 | Sato ............................ 359/557 |
| 5,579,171 A | 11/1996 | Suzuki et al. ............... 359/687 |
| 5,585,966 A | 12/1996 | Suzuki ........................ 359/557 |
| 5,598,299 A | 1/1997 | Hayakawa ................... 359/557 |
| 5,751,485 A | 5/1998 | Suzuki ........................ 359/557 |
| 5,760,957 A * | 6/1998 | Suzuki ........................ 359/554 |
| 6,384,975 B1 * | 5/2002 | Hayakawa ................... 359/557 |

FOREIGN PATENT DOCUMENTS

| JP | 50-80147 | 6/1975 |
| JP | 56-21133 | 5/1981 |
| JP | 56-34847 | 8/1981 |
| JP | 57-7414 | 2/1982 |
| JP | 61-223819 | 10/1986 |

* cited by examiner

*Primary Examiner*—Mark A. Robinson
(74) *Attorney, Agent, or Firm*—Fitzpatrick, Cella, Harper & Scinto

(57) ABSTRACT

An image stabilizing optical lens device including, in order from an object side to an image side of the image stabilizing optical lens device, a first lens unit having positive refractive power, a second lens unit having negative refractive power and being movable along an optical axis of the image stabilizing optical lens device to perform focusing, and a third lens unit having positive refractive power, the third lens unit including a front lens sub-unit having negative refractive power and being movable so as to be decentered with respect to the optical axis and a rear lens sub-unit having positive refractive power.

7 Claims, 13 Drawing Sheets

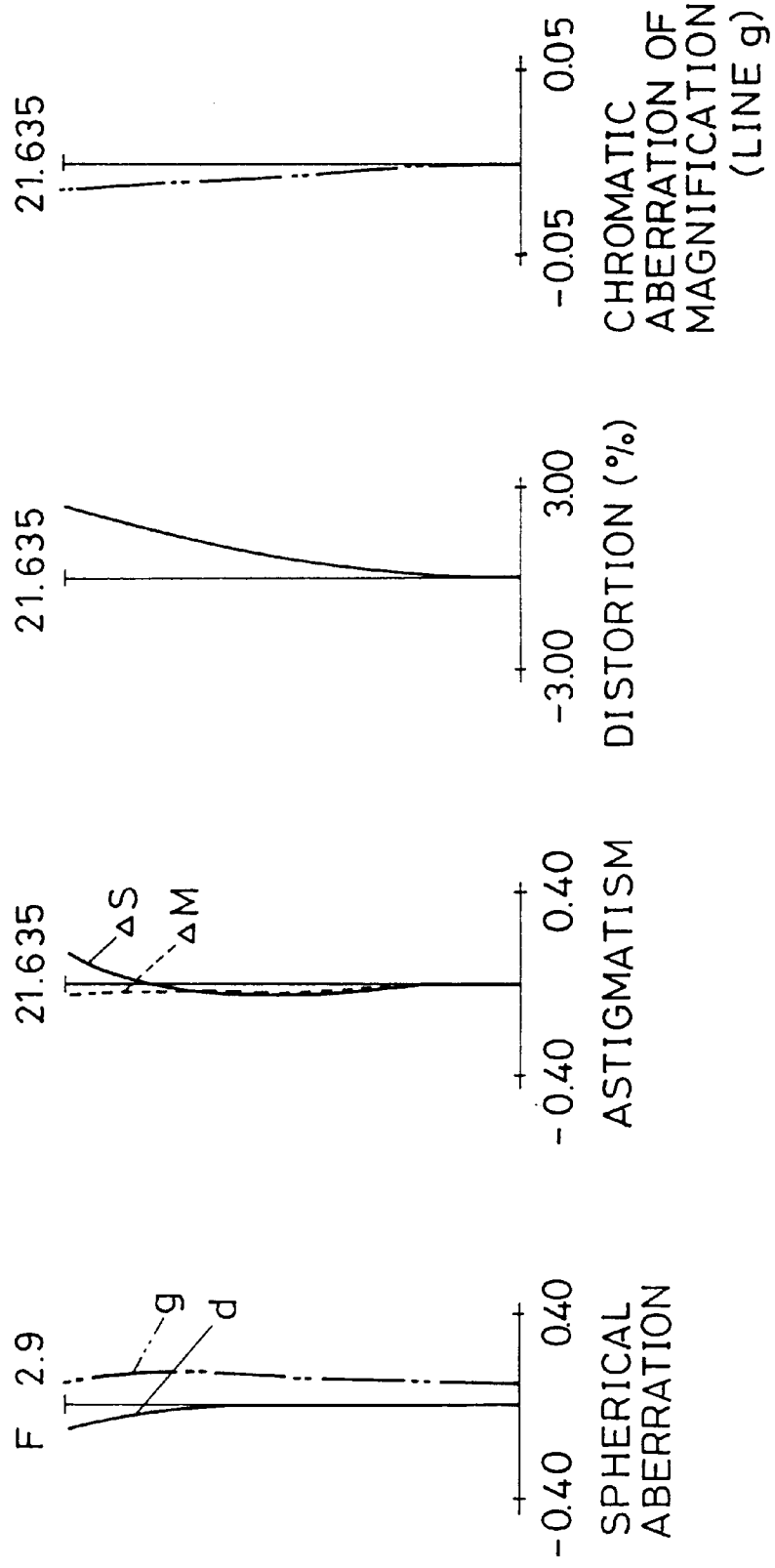

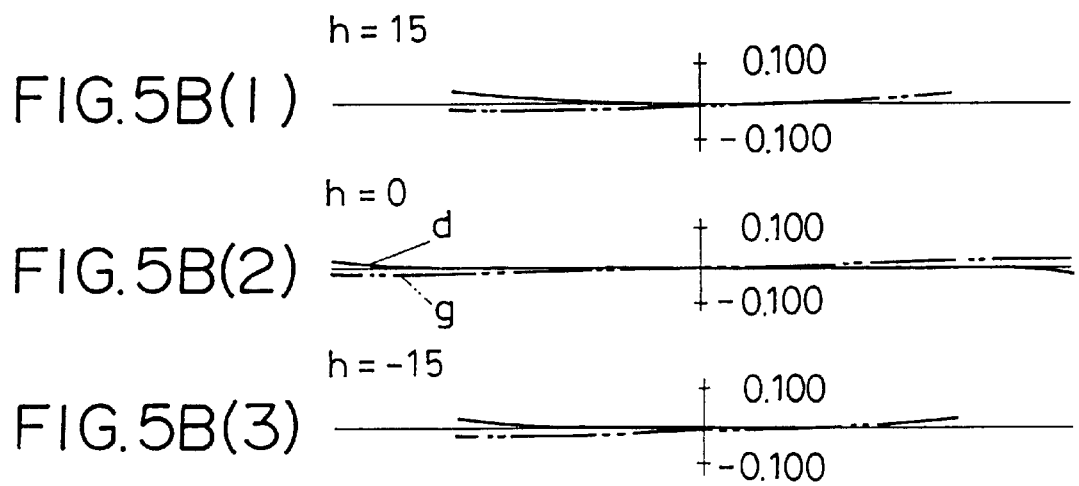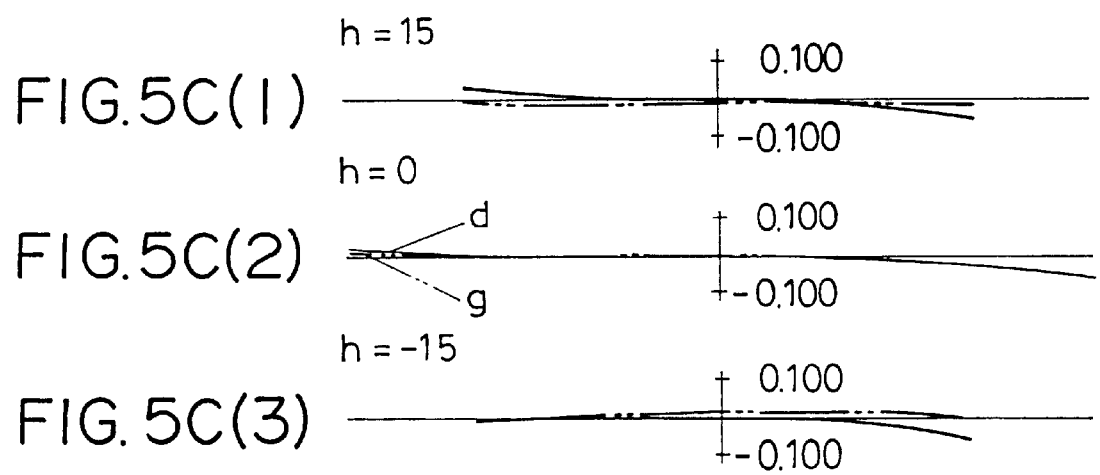

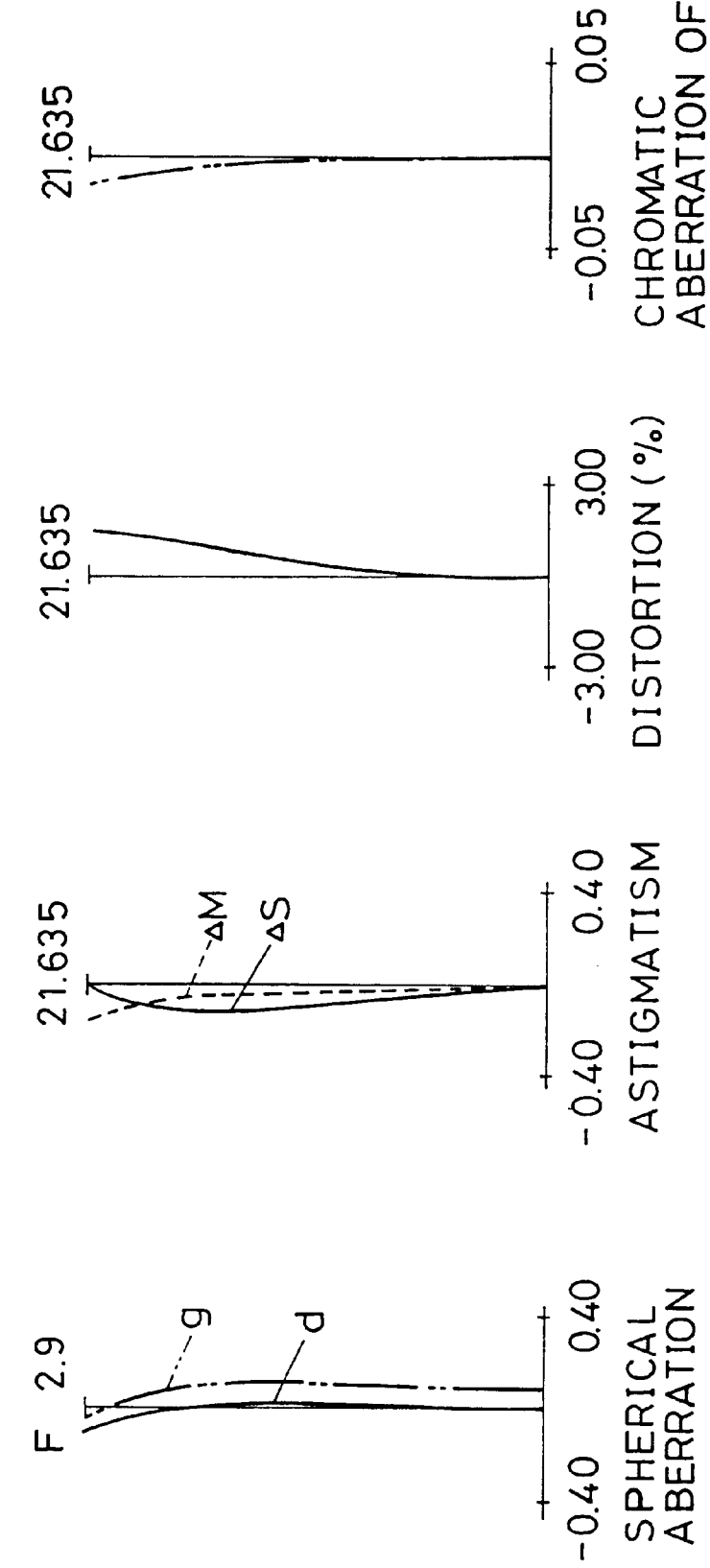

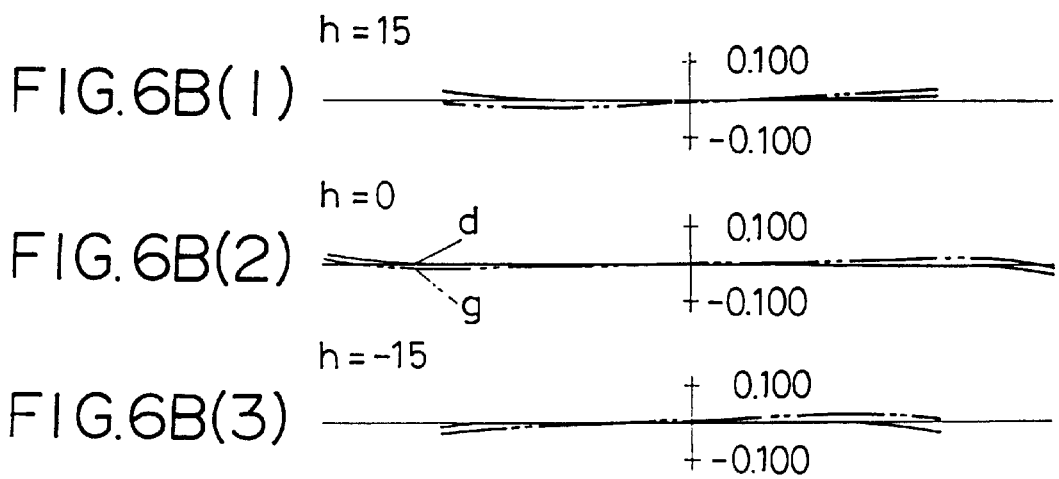
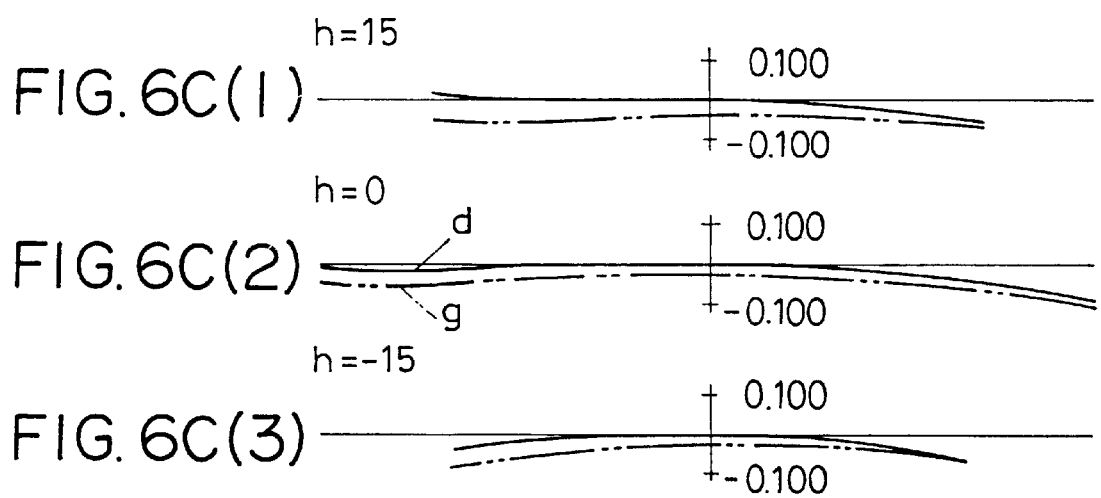

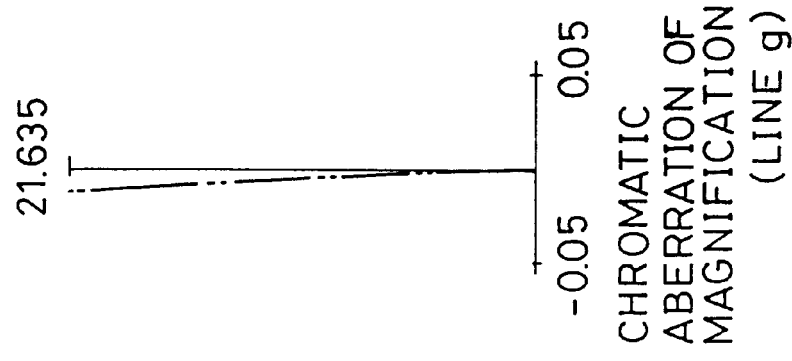
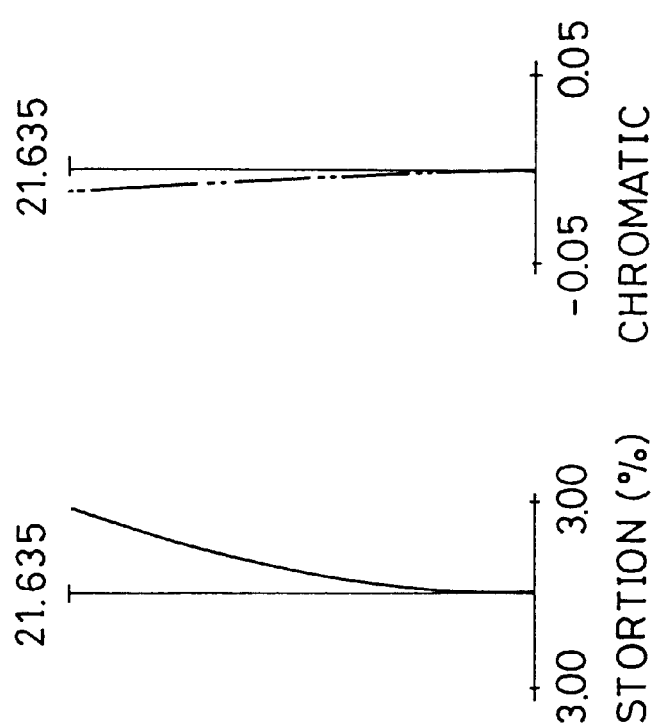
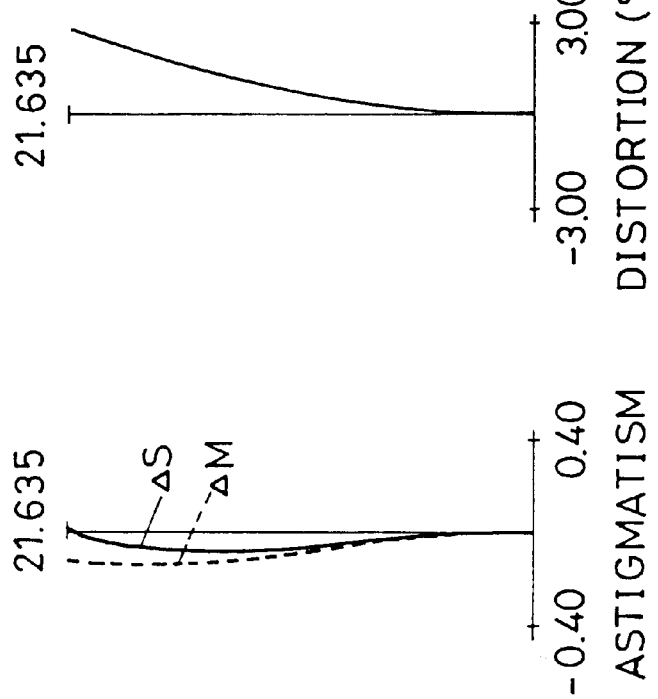
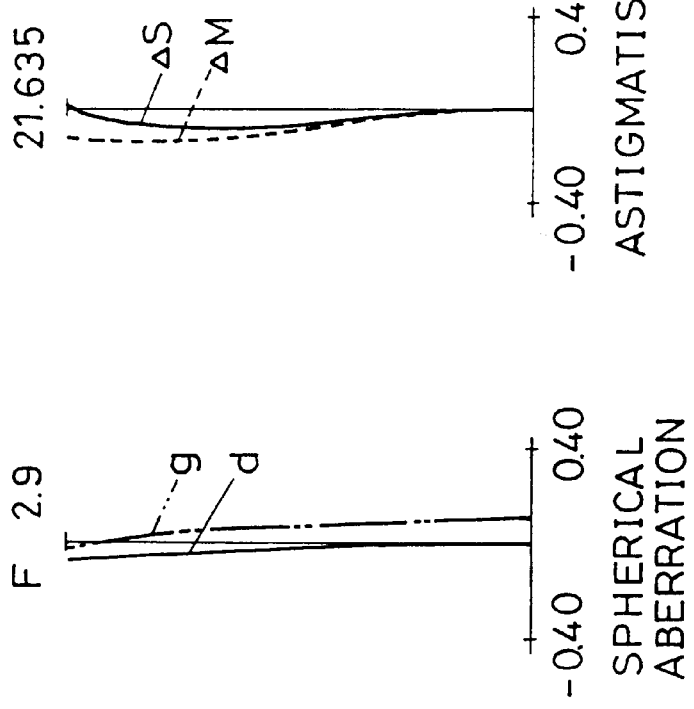

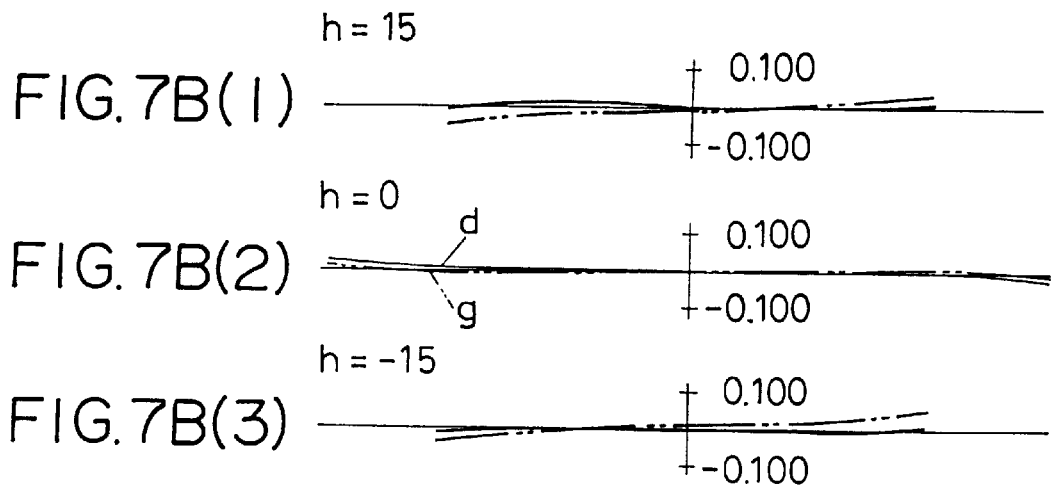
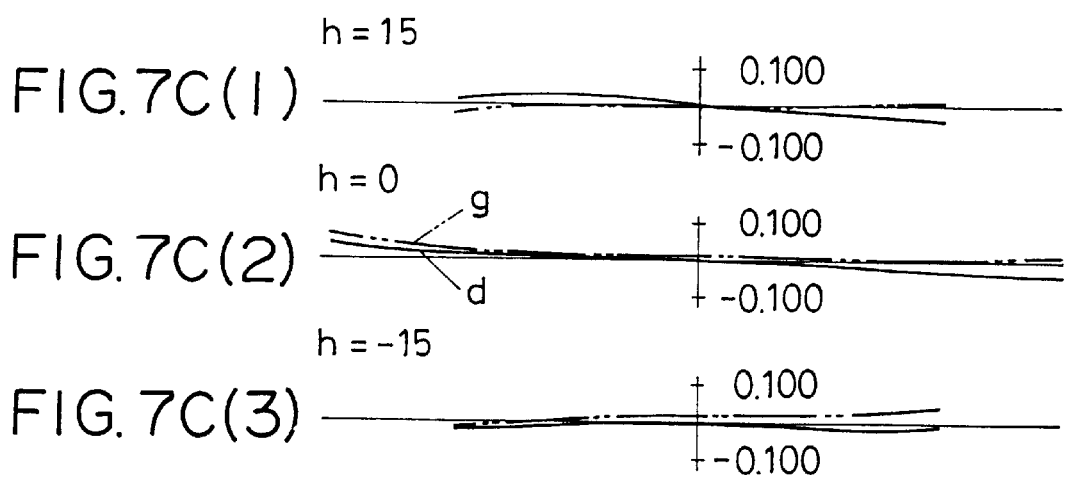

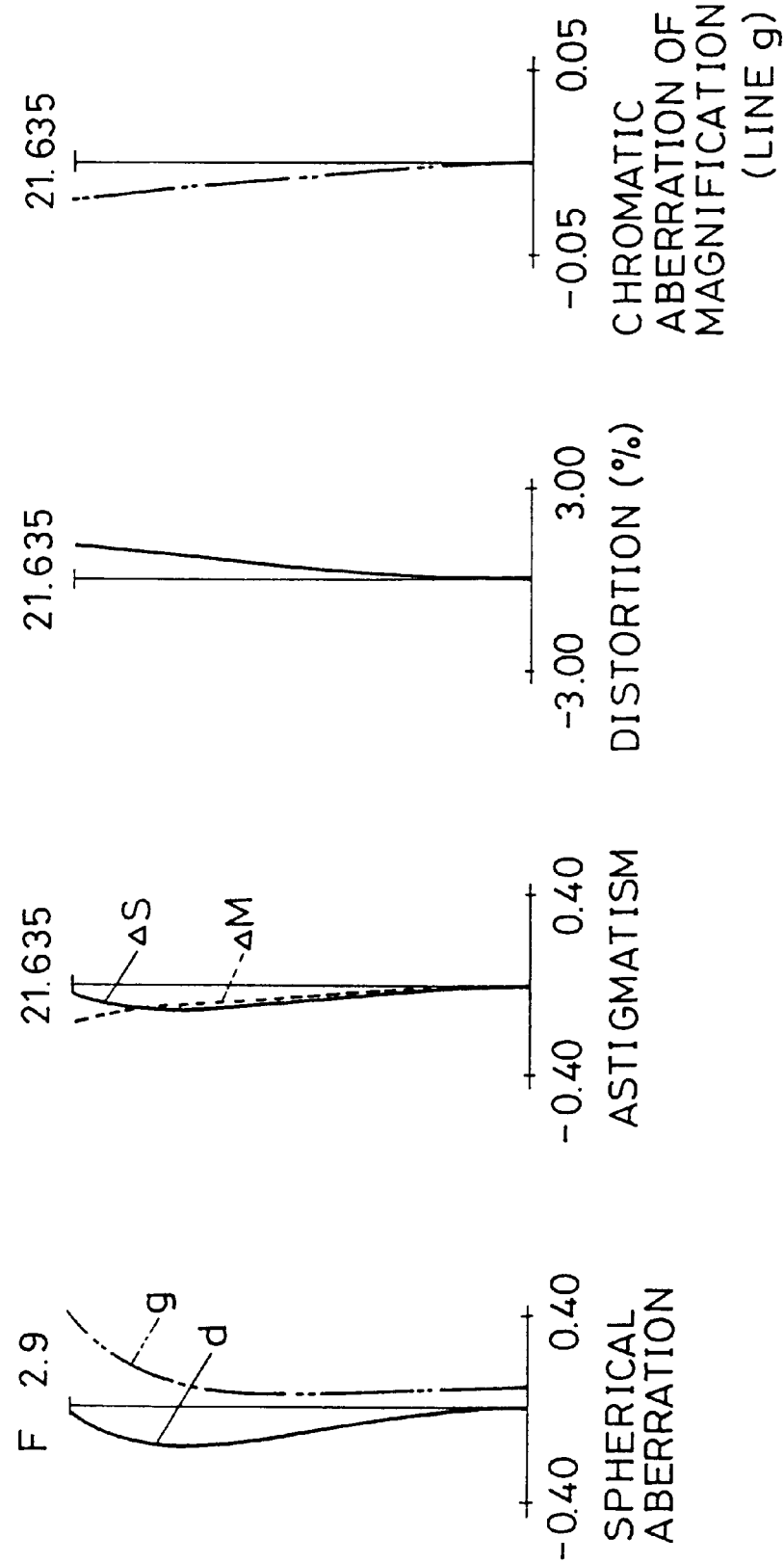

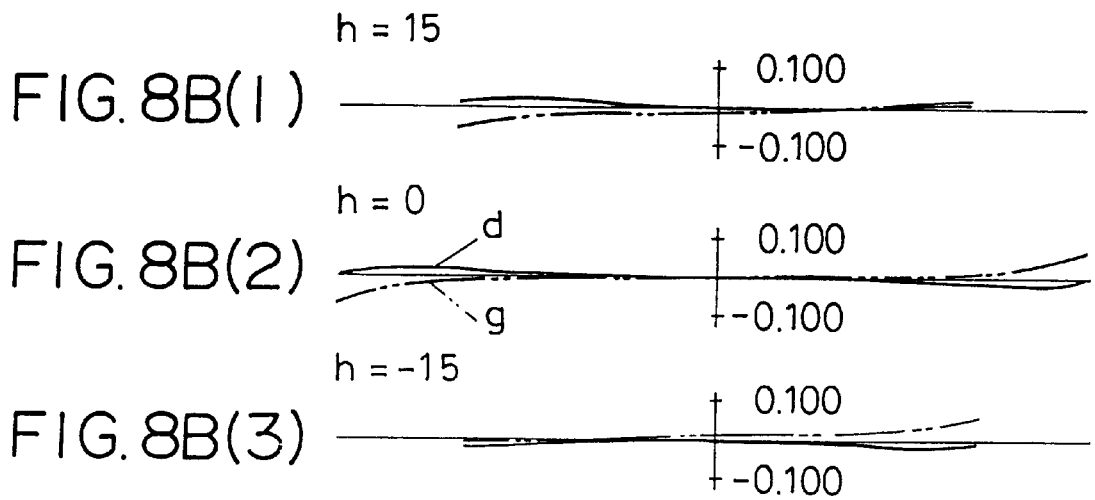
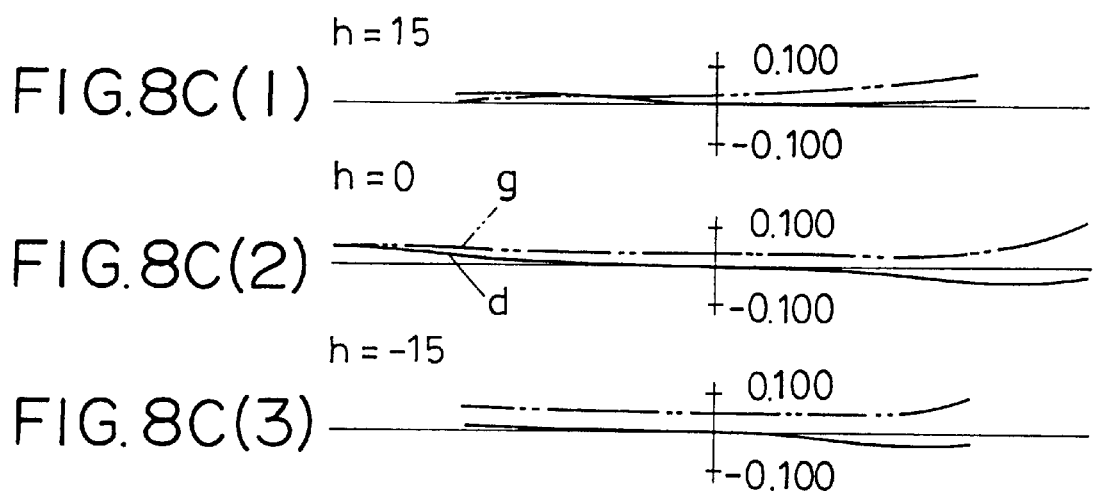

FIG. 9
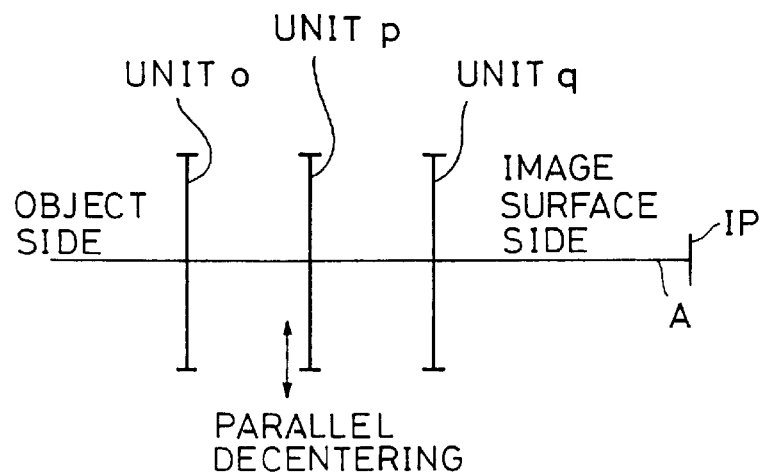
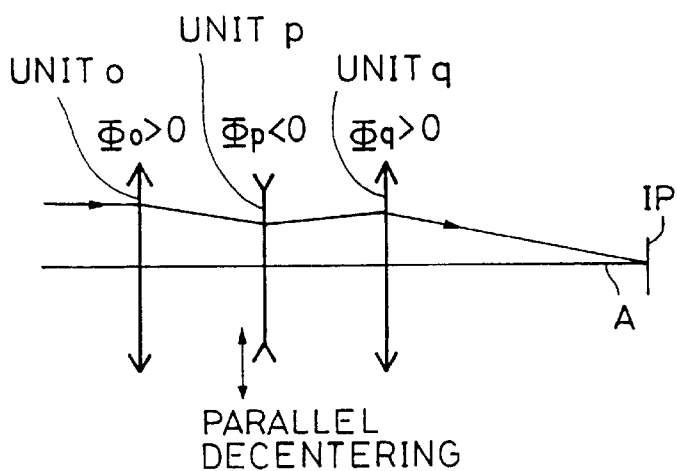
FIG. 10A
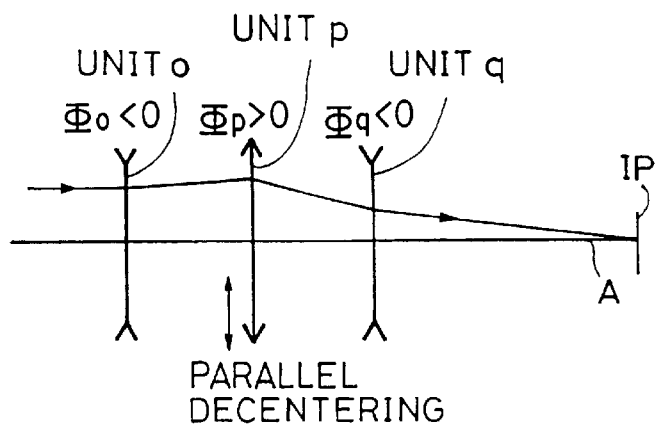
FIG. 10B

IMAGE STABILIZING OPTICAL LENS DEVICE WITH DECENTERING OF LENS SUB-UNIT

CROSS REFERENCE TO RELATED APPLICATION

This is a divisional application of application Ser. No. 08/638,581 filed Apr. 29, 1996 now U.S. Pat. No. 6,384,975.

BACKGROUND OF THE INVENTION

1. Field of the Invention

The present invention relates to an image stabilizing optical lens device for use in an image-taking optical system and having a so-called anti-vibration function which stabilizes an image against vibration of the image-taking optical system. More particularly, the present invention relates to an optical system having an anti-vibration function of inner focus type, which is capable of preventing degradation of optical performance which otherwise would be caused when the anti-vibration effect is produced by moving an anti-vibration movable lens unit in a direction which is, for example, perpendicular to the optical axis.

2. Description of the Related Art

Image pickup by an image pickup device such as a camera on a running vehicle such as a motorcar or an aircraft tends to suffer from blur of the image due to vibration transmitted from the vehicle to an image pickup optical system, such as a photographing lens of the image pickup device.

It is difficult to stabilize the image against vibration of the image pickup optical system, particularly when the image pickup optical system has a long focal length. More specifically, when the image pickup optical system is tilted due to vibration, the picked-up image vibrates at an amplitude which corresponds to the product of the angle of tilt and the focal length of the image pickup optical system. Therefore, a still image pickup apparatus is required to employ an exposure time which is short enough to avoid degradation of the image quality which otherwise would be caused due to vibration, whereas a dynamic image pickup apparatus suffers a problem of difficulty in maintenance of the image composition. In picking up images with these apparatuses, therefore, it is necessary to effect compensation for tilting of the image pickup optical system caused by vibration, thereby preventing vibratory displacement of the picked-up image, i.e., blur of the image.

Anti-vibration optical systems having a function of preventing blur of a picked-up image are disclosed in, for example, Japanese Patent Laid-Open No. 50-80147, Japanese Patent Publication No. 56-21133 and Japanese Patent Laid-Open No. 61-223819.

More specifically, Japanese Patent Laid-Open No. 50-80147 discloses a zoom lens device incorporating a pair of afocal variable power systems including a first system having an angular magnification $M_1$ and a second system having an angular magnification $M_2$. Magnifying or power varying operations are performed by the first and second focal variable power systems in such a manner as to meet the condition of $M_1=1-1/M_2$, while the second variable power system is spatially fixed, thereby effecting compensation for vibration of an image, and thus stabilizing the picked-up image.

Japanese Patent Publication No. 56-21133 discloses a system in which vibration of an optical system is detected by a detecting means, and a part of the optical components is moved in response to an output from the detecting means in a direction for canceling vibratory displacement of an image, thereby stabilizing the image.

Japanese Patent Laid-Open No. 61-223819 discloses an image pickup optical system in which a refractive variable-apex-angle prism is disposed closest to the object, the apex angle of the prism being varied to deflect the image in such a manner as to compensate for vibration of the image pickup optical system, thereby stabilizing the image.

In apparatuses of the type disclosed in Japanese Patent Publication Nos. 56-34847, 57-7414 and so forth, an image pickup optical system is provided in a portion thereof with an optical element which is spatially fixed against vibration of the image pickup optical system. The optical element produces a prism effect in accordance with the vibration of the optical system so as to deflect the picked-up image, whereby a still image is obtained on the focal plane.

A method also has been proposed in which a lens unit in an image pickup optical system is vibrated in the direction perpendicular to the optical system in response to an output from an acceleration sensor which senses vibration of the image pickup optical system, thereby stabilizing the picked-up image. This method is proposed, for example, in the specifications of U.S. Pat. Nos. 5,000,549 and 4,974,950, as well as in U.S. patent application Ser. No. 425,749 filed Apr. 2, 1995.

In general, image stabilizing devices of the type which produces a stable still image by vibrating a lens unit so as to cancel the effect of vibration of the optical system are required to provide a large amplitude of compensation for image vibration with a small amplitude or amount of vibratory movement or rotation of the lens unit, i.e., a movable lens unit having plural lenses, which is vibrated to cancel the effect of vibration of the optical system.

Decentering of a movable lens unit causes a blur of the image due to eccentric aberration accompanying compensation for image vibration, when a large aberration occurs, such as eccentric comatic aberration, eccentric astigmatism, eccentric chromatic aberration or eccentric field curvature aberration. For instance, occurrence of a large eccentric distortion causes a large difference between the amount of movement of the image on the optical axis and the amount of movement of the image in the peripheral region. Therefore, when the movable lens unit is decentered in such a manner as to compensate for vibration of the image on the optical axis, a phenomenon resembling the blur of the image takes place in the peripheral region, so as to seriously impair the optical characteristics.

Thus, an optical system having an anti-vibration function, incorporating a movable lens unit movable perpendicularly to the optical axis with or without simultaneous slight rotation about a point on the optical axis so as to cause decentering, has to meet the following requirements.

The first requirement is that the amount of eccentricity aberration caused when the movable lens unit is moved perpendicularly to the optical axis with or without simultaneous rotation, is small enough to suppress degradation of the image quality attributable to such aberration.

The second requirement is that the optical system has a large decentering sensitivity, which is defined as the ratio $\Delta x/\Delta H$ of the amount $\Delta x$ of correction of image vibration to the unit amount $\Delta H$ of decentering movement. This requirement is in order that a large effect of image vibration prevention is obtained with a small amount of movement or rotation of the movable lens unit, thus contributing to a reduction in the size of the whole apparatus.

The optical system having an anti-vibration function relying on spatial fixing of an optical element cannot suitably be used in small and light-weight apparatuses, because of difficulty encountered in the spatial fixing of the element and in the design of a small-sized optical system.

The optical system which employs a variable-apex-angle prism disposed closest to the object also is disadvantageous in that it requires a large-size actuator and in that it is not easy to simply correct eccentric chromatic aberration, although it provides an advantage that almost no aberration other than eccentric (decentering) chromatic aberration is caused.

The optical system of the type which relies on decentering of a lens unit can have a reduced size, provided that the lens unit to be decentered is suitably selected and positioned. This type of optical system, however, suffers from a problem in that it is not easy to achieve a large amount of compensation against vibration with a small amount of actuation while satisfactorily correcting aberrations caused by the decentering, such as eccentricity coma aberration, eccentricity astigmatism, eccentricity field curvature and so forth.

SUMMARY OF THE INVENTION

An object of the present invention is to provide an optical system having an anti-vibration function of the type in which a selected lens unit is moved in the direction perpendicular to the optical axis so as to compensate for image vibration, thereby stabilizing the image, wherein the lens elements of the lens unit are suitably arranged so as to enable satisfactory correction of various kinds of aberration, while realizing a large amount of compensation for image vibration with a small amount of decentering, thus contributing to reduction in the size of the whole apparatus. Such an optical system is particularly suitable for use as an inner-focus-type medium-telephoto optical system.

To this end, in one aspect, the present invention relates to an image stabilizing optical lens device, comprising, in order from an object side to an image side of the image stabilizing optical lens device, a first lens unit having positive refractive power, a second lens unit having negative refractive power and being movable along an optical axis of the image stabilizing optical lens device to perform focusing, and a third lens unit having positive refractive power and including, in order from the object side to the image side, a front lens sub-unit having negative refractive power and being movable so as to be decentered with respect to the optical axis, and a rear lens sub-unit having positive refractive power.

In this image stabilizing optical lens device, the focal distances of the lens units are determined in relation to the overall focal length of the whole image stabilizing optical lens device, in such a manner as to meet the conditions of the following equations (1) to (3) in which fi indicates the focal length of the i-th lens unit, and f represents the overall focal length of the whole image stabilizing optical lens device.

$$0.4 < f1/f < 0.8 \quad (1)$$

$$0.4 < |f2/f| < 0.8 \quad (2)$$

$$0.8 < f3/f < 5.0 \quad (3)$$

In another aspect, the present invention relates to an image stabilizing optical apparatus comprising, in order from an object side to an image side of the image stabilizing optical lens device, a first lens unit having positive refractive power, a second lens unit having negative refractive power and being movable along an optical axis of the image stabilizing optical lens device to perform focusing, and a third lens unit having positive refractive power and including, in order from the object side to the image side, a front lens sub-unit having negative refractive power and being movable so as to be decentered with respect to the optical axis, and a rear lens sub-unit having positive refractive power, wherein the front lens sub-unit is movable so as to be decentered away from the optical axis in one of (i) a direction perpendicular to the optical axis of the image stabilizing optical apparatus and (ii) a direction along a spherical path defined by a point on the optical axis disposed a predetermined distance towards the image side away from the third lens unit.

The above and other objects, features and advantages of the present invention will become clear from the following description of the preferred embodiments when the same is read in conjunction with the accompanying drawings.

BRIEF DESCRIPTION OF THE DRAWINGS

FIGS. 5A(1), 5A(2), 5A(3), and 5A(4) are diagrams showing longitudinal aberration as observed when the object distance is 50 times as large the focal length in the first numerical example;

FIGS. 5B(1), 5B(2), and 5B(3) are diagrams showing transverse aberration in normal state as observed when the object distance is 50 times as large as the focal length in the first numerical example;

FIGS. 5C(1), 5C(2), and 5C(3) are diagrams showing transverse aberration as observed after a power correction at an image plane of 1° when the object distance is 50 times as large as the focal length in the first numerical example;

FIGS. 6A(1), 6A(2), 6A(3) and 6A(4) are diagrams showing longitudinal aberration as observed when the object distance is 50 times as large as the focal length in the second numerical example;

FIGS. 6B(1), 6B(2), and 6B(3) are diagrams showing transverse aberration in normal state as observed when the object distance is 50 times as large as the focal length in the second numerical example;

FIGS. 6C(1), 6C(2), and 6C(3) are diagrams showing transverse aberration as observed after a power correction at an image plane of 1° when the object distance is 50 times as large as the focal length in the second numerical example;

FIGS. 7A(1), 7A(2), 7A(3), and 7A(4) are diagrams showing longitudinal aberration as observed when the object distance is 50 times as large as the focal length in the third numerical example;

FIGS. 7B(1), 7B(2), and 7B(3) are diagrams showing transverse aberration in normal state as observed when the object distance is 50 times as large as the focal length in the third numerical example;

FIGS. 7C(1), 7C(2), and 7C(3) are diagrams showing transverse aberration as observed after a power correction at an image plane of 1° when the object distance is 50 times as large as the focal length in the third numerical example;

FIGS. 8A(1), 8A(2), 8A(3), and 8A(4) are diagrams showing longitudinal aberration as observed when the object distance is 50 times as large as the focal length in the fourth numerical example;

FIGS. 8B(1), 8B(2), and 8B(3) are diagrams showing transverse aberration in normal state as observed when to the object distance is 50 times as large as the focal length in the fourth numerical example;

FIGS. 8C(1), 8C(2), and 8C(3) are diagrams showing transverse aberration as observed after a power correction at an image plane of 1° when the object distance is 50 times as large as the focal length in the fourth numerical example;

FIG. 9 is a schematic diagrammatic illustration of a lens arrangement explanatory of compensation for eccentric aberration effected in the present invention; and FIGS. 10A and 10B are schematic diagrammatic illustrations of lens arrangements explanatory of compensation for eccentric aberration effected in the present invention.

DESCRIPTION OF THE PREFERRED EMBODIMENTS

Figure 1:
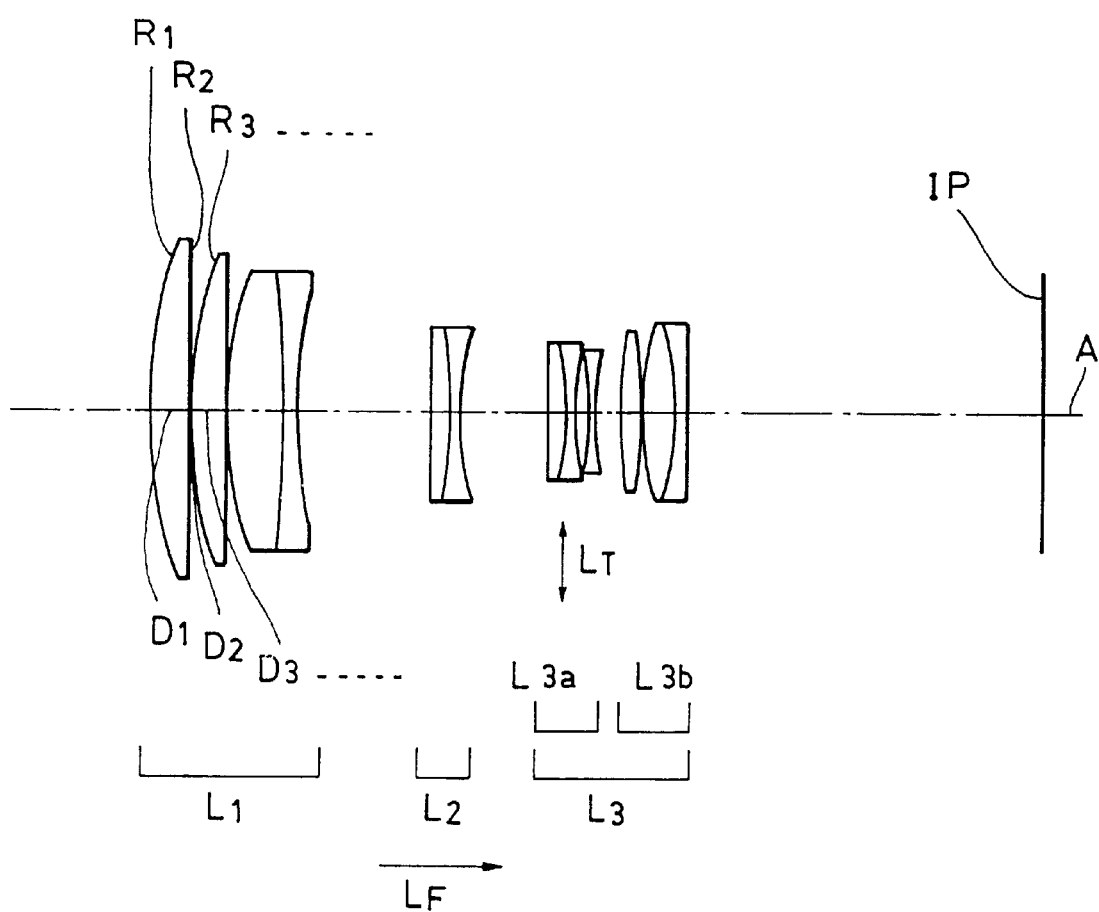
FIG. 1 is a diagrammatic sectional view of a lens system in accordance with a first numerical example of the present invention.
Figure 2:
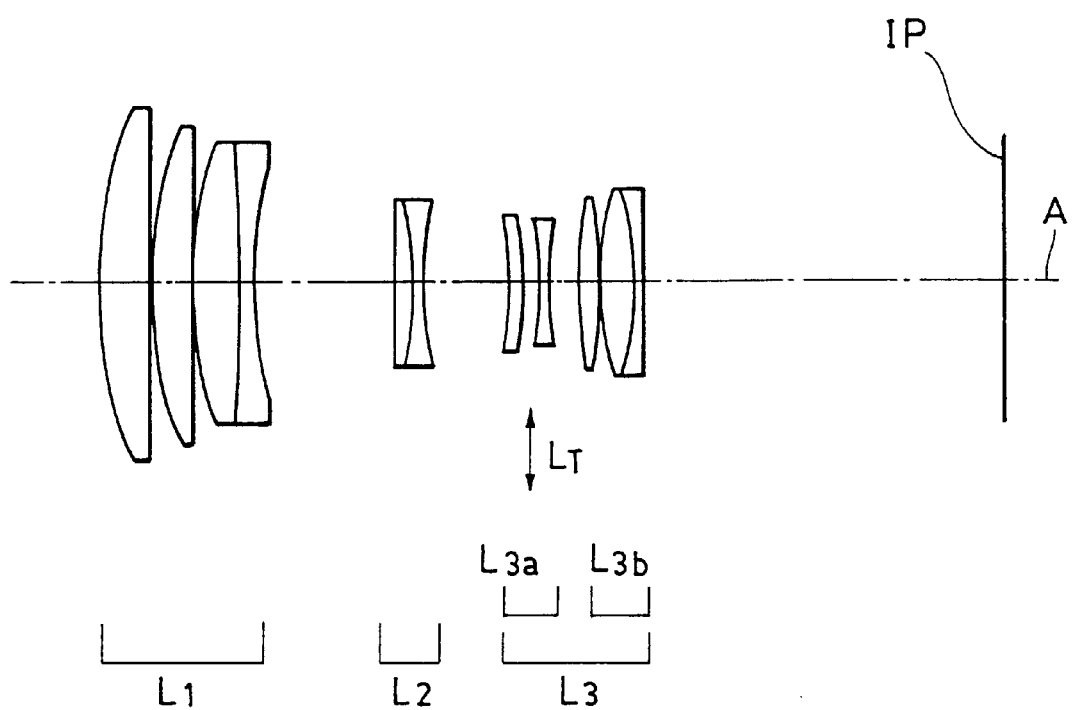
FIG. 2 is a diagrammatic sectional view of a lens system in accordance with a second numerical example of the present invention.
Figure 3:
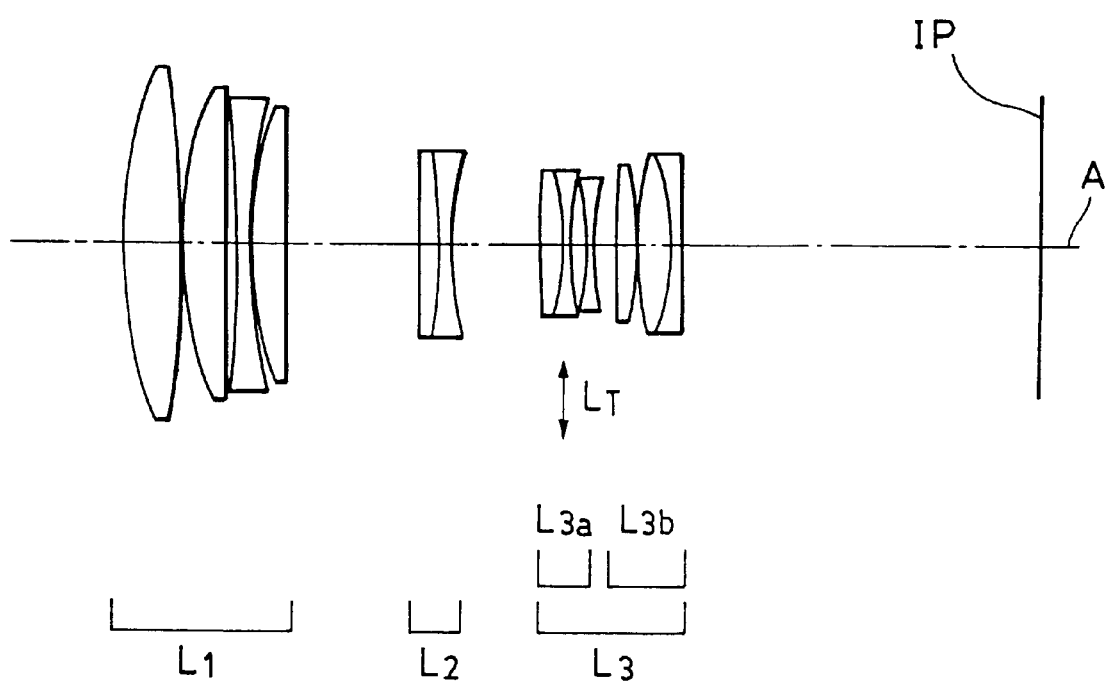
FIG. 3 is a diagrammatic sectional view of a lens system in accordance with a third numerical example of the present invention.
Figure 4:
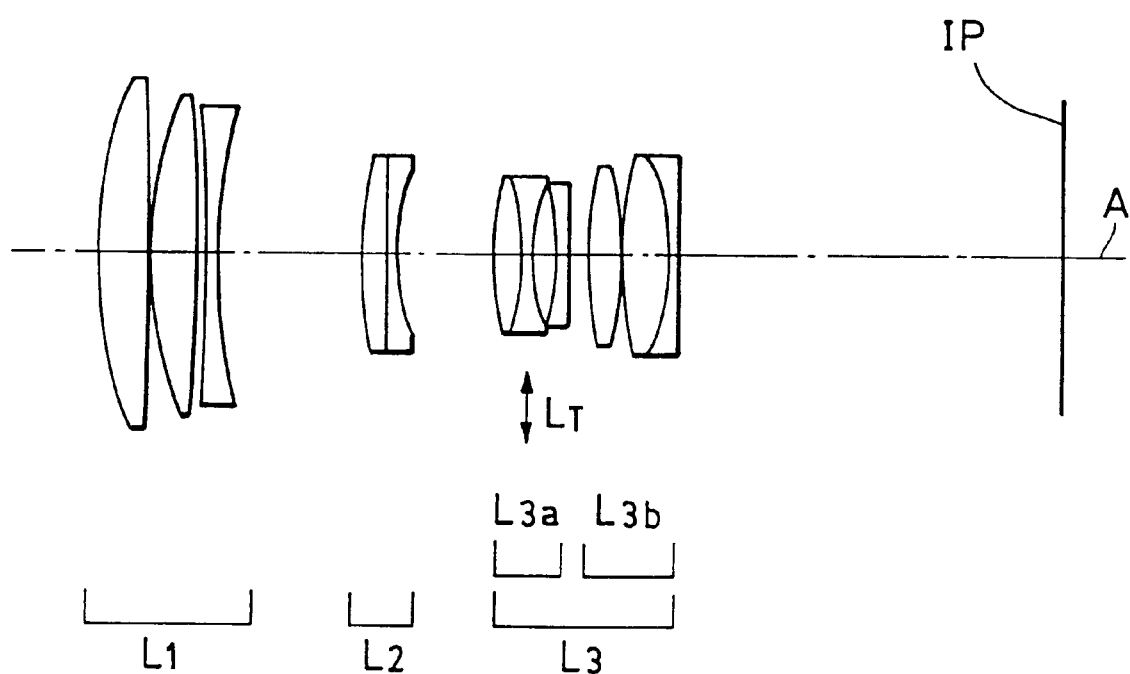
FIG. 4 is a diagrammatic sectional view of a lens system in accordance with a fourth numerical example of the present invention.

Referring to FIGS. 1 to 4, which are diagrammatic sectional views of lens systems in accordance with first to fourth numerical examples of an embodiment of the present invention, respectively, there are shown, in order from an object side to an image plane side of the lens system, a first lens unit L1 having a positive refractive power, a second lens unit L2 having a negative refractive power, and a third lens unit L3 having a positive refractive power. The third lens unit L3 includes, in order from the object side to the image plane side, a front lens sub-unit L3a having a negative refractive power and a rear lens sub-unit L3b having a positive refractive power. Change of focus from infinity towards the closest point is effected by moving the second lens unit L2 towards the image plane as indicated by an arrow LF. The front lens sub-unit L3a is movable as indicated by an arrow LT in the direction perpendicular to the optical axis A of the lens system so as to effect correction, i.e., vibration compensation, against any blur of the picked-up image, caused by vibration of the optical system. The image plane is indicated by IP.

Thus, the illustrated examples perform inner focusing and correction against blur of the image. At the same time, optical constants of the lens units are determined in accordance with the aforementioned conditional equations (1), (2) and (3). This enables effective correction against blur of the picked-up image, while achieving reduction in the size of the whole optical system. At the same time, the optical system of this embodiment effectively reduces generation of aberrations attributable to the movement of the front lens sub-unit L3a in the direction perpendicular to the optical axis, i.e., eccentricity aberrations attributable to the decentering such as eccentricity comma aberration, eccentricity astigmatism, eccentricity field curvature and so forth, thus offering superior optical performance.

A description will now be given of the technical significance of the conditions represented by the equations (1) to (3). The conditional equations (1), (2) and (3) determine the ranges of ratios of the focal lengths of the first, second and the third lens units, respectively, to the whole optical system. These conditions are intended to satisfactorily suppress various types of aberration and to reduce the size of the whole lens system, so as to enable the lens system to be used suitably as a medium-telephoto image pickup optical system, while preventing an excessive increase in the amount of movement of the second lens unit which serves as the focusing lens unit.

Decrease of the focal length of the first lens unit to a value below the lower limit of the range specified by the conditional equation (1) increases difficulty encountered in achieving the correction against aberrations, although it helps in reduction in the overall length of the optical system. Conversely, increase of the focal length of the first lens unit beyond the upper limit of the range specified by the equation (1) tends to increase the overall length of the optical system, although it facilitates correction against aberrations.

Reduction of the focal length of the second lens unit to a value below the lower limit of the range specified by the equation (2) on one hand offers an advantage in that the amount of movement of the second lens unit required for focusing can be decreased, but on the other hand increases difficulty in the correction against aberrations. Conversely, increase of the focal length of the second lens unit beyond the upper limit of the range specified by the equation (2) undesirably increases the amount of movement of the second lens unit required for focusing, although it facilitates correction against aberrations.

Reduction of the focal length of the third lens unit below the lower limit of the range specified by the condition (3) makes it necessary to set the composite refractive power of the first and second lens units to a small positive value or a negative value, resulting in an increased overall length of the optical system. Conversely, when the focal length of the third lens unit is increased beyond the upper limit of the range specified by the equation (3), the symmetry of the whole optical system is impaired so as to generate many asymmetrical aberrations which are difficult to eliminate, although the overall length of the optical system tends to become small.

The described embodiment of the optical system of the invention having an anti-vibration function is designed such that the optical distances of the respective lens units meet the conditions of the equations (1) to (3), respectively, so as to realize a medium-telephoto image pickup optical system having an appropriate arrangement of refractive power. In addition, the third lens unit is composed of a front lens sub-unit L3a having a negative refractive power and a rear lens sub-unit L3b having a positive refractive power, the front lens sub-unit L3a being movable in the direction substantially perpendicular to the optical axis of the optical system, so as to effect compensation for the influence of vibration of the optical system.

By virtue of the above-described features of lens arrangement, the present invention effectively reduces eccentricity aberrations while effecting correction against blur of a picked-up image, thus attaining superior optical performance.

According to the present invention, in order to achieve further improvement in optical performance by further reduction in the eccentricity aberrations caused by the anti-vibration correcting operation, it is advisable that at least one of the following conditions (i) to (v) is met:

(i) Each of the front lens sub-unit L3a and the rear lens sub-unit L3b is composed of a lens group having at least one positive lens and at least one negative lens. Such an arrangement of lenses can efficiently eliminate eccentricity aberrations which are produced during vibration compensation.

In general, eccentricity aberrations generated during vibration compensation depend on the quantities of light rays impinging upon and emitted from each lens unit and the amount of residual aberration in each lens unit. In order to effectively reduce the aberrations, therefore, it is necessary to appropriately set the arrangement of refractive power, as well as residual aberration, in each lens unit. To cope with such requirements, in this embodiment, it is preferred that each lens sub-unit is composed of a lens group which includes at least one positive lens and at least one negative lens, and residual aberration of each lens sub-unit is suitably corrected.

In order to enable free setting of the Petzval sum of a lens unit having a given refractive power and composed of a single element lens, it is an effective measure to increase or decrease the refractive index of the lens by employing lens materials of different levels of refractive power. However, when ordinary lens materials are to be used, it is difficult to greatly vary the Petzval sum, because such ordinary lens materials can provide only a limited range of refractive power. In view of this fact, in this embodiment, each lens unit is composed of a lens unit group having at least one positive lens and at least one negative lens, in order to allow a greater freedom of setting of residual aberration of each lens unit.

(ii) It is preferred that the condition of the following equation (4) is satisfied:

$$0.15 < |f3a/f| < 0.5 \tag{4}$$

where f3a represents the focal length of the front lens sub-unit L3a.

The equation (4) determines the range of the ratio, to the focal length of the whole optical system, of the focal length of the front lens sub-unit L3a which constitutes the component of the third lens unit L3 closer to the object and which is to be moved in the direction perpendicular to the optical axis when vibration compensation is effected. This condition is intended to realize required vibration compensation performance with a reduced amount of movement of the front lens sub-unit L3a, while suppressing generation of eccentricity aberrations.

When the focal length of the front lens sub-unit L3a is reduced below the lower limit of the range specified by the equation (4), it is difficult to reduce the number of element lenses of the front lens sub-unit L3a while appropriately setting the residual aberration, making it difficult to obtain a compact construction of the whole lens system.

Conversely, increase of the focal length of the front lens sub-unit L3a beyond the upper limit of the range specified by the equation (4) makes it difficult to obtain a large value of the decentering sensitivity which is ratio of the amount of decentering of the lens unit to the amount of displacement of the picked-up image, so that a greater amount of driving of the front lens sub-unit L3a is required for a certain amount of vibration compensation, although such an increase in the focal length is advantageous from the viewpoint of suppression of aberrations.

When the focal length of the front lens sub-unit L3a is set so as to fall out of the range specified by the equation (4), it is difficult to effect correction against eccentricity aberrations caused by decentering of the front lens sub-unit L3a, in an optical system which is designed to meet only the requirements of the equations (1) to (3).

(iii) It is preferred that the first lens unit has a pair of positive lenses and a negative lens, while the second lens unit has a positive lens and a negative lens. With this arrangement, it is possible to obtain an optical system which is better suited for use in a medium-telephoto image pickup system.

In the medium-telephoto type optical system of this embodiment, the lens units have their own functions. Namely, the first lens unit has a primary function of image formation. The second lens unit performs a focusing function, while contributing to the reduction in the overall length of the optical system. The third lens unit includes a lens sub-unit having the vibration compensation function, and serves to achieve symmetry of arrangement of refractory power, so as to enable effective correction against asymmetrical aberrations.

In order to perform these functions, each of the lens units is preferably composed of a plurality of lenses. More specifically, the first lens unit, which has to have a positive refractive power to perform the image forming function, preferably has at least two positive lenses in order to perform a satisfactory image forming function over the viewing angle of the medium-telephoto image pickup optical system having a compact construction.

It is also preferred that the first lens unit incorporates a negative lens, in order to effectively perform satisfactory correction of chromatic aberration.

The second lens unit is intended to perform a focusing function and to provide a reduced overall length of the whole optical system and, hence, has a negative refractive power. In order to reduce variation in aberrations during focusing, in particular the variation in the chromatic aberration, it is preferred that the second lens unit has at least one positive lens and at least one negative lens, so as to satisfactorily reduce chromatic aberration.

Thus, the described embodiment employs appropriate lens arrangements for the first and second lens units, thus achieving an optical system having superior optical performance.

(iv) It is preferred that the condition of the following equation (5) is met:

$$0.15 < Da/f < 0.5 \tag{5}$$

where Da represents the distance between the apex of the lens surface of the first lens unit closest to the image plane and the apex of the lens surface of the third lens unit closest to the object.

The equation (5) determines the ratio, to the overall focal length of the whole optical system of the distance between the first and third lens units which are kept stationary during focusing. This condition is intended to provide a space large enough to accommodate the movement of the second lens unit during focusing, without causing any excessive increase in the overall length of the optical system. Obviously, when the distance between the first lens unit and the third lens unit is reduced to a value below the lower limit of the range specified by the equation (5), the focusing movement of the second lens unit is undesirably limited, so that the closest focal point obtainable with the optical system is not sufficiently close to the optical system. Conversely, when the distance between the first lens unit and the third lens unit exceeds the upper limit of the range specified by the equation (5), the overall length of the whole optical system is undesirably increased.

The optical system in accordance with the present invention, when designed and constructed to met the condition of the equation (5), is satisfactory both in the compactness of the construction and closeness of the closest focal point.

(v) From the viewpoint of aberration correction, the lens units preferably have the following constructions. More specifically, it is preferred that the first lens unit has one of the following three types of arrangement (a) to (c):

(a) four lenses in total, including two positive lenses having convex sides directed to the object, and a positive lens and a negative lens adhered to each other;

(b) three lenses in total, including two positive lenses having convex sides directed to the object, and a negative lens both sides of which are concave; and (c) four lenses in total, including two positive lenses having convex sides directed to the object, a negative lens having both sides concave, and a meniscus-type positive lens having a convex side directed to the object.

It is also preferred that the second lens unit is composed of a meniscus-type lens obtained by adhering a positive lens and a negative lens to each other, with the convex side directed to the object.

It is also preferred that the front lens sub-unit L3a is constituted either by (a) a combination of (i) a composite lens obtained by adhering a positive lens having both sides convex and a negative lens having both sides concave, and (ii) a negative lens having both sides concave, or by (b) a combination of a meniscus-type positive lens with the convex side directed to the image plane and a negative lens having both sides concave.

It is also preferred that the rear lens sub-unit L3b is constituted by a combination of (i) a positive lens with both sides convex and (ii) a composite lens obtained by adhering a positive lens having both sides convex and (ii) a negative lens to each other.

A description will now be given of the optical characteristics of the optical system of the invention having an anti-vibration function.

In general, a translational decentering movement of a lens unit of an optical system, intended to effect correction against blur of image caused by vibration, is inevitably accompanied by impairment of image forming performance due to generation of eccentricity aberrations. A reference is therefore made to a method which was proposed by MATSUI in the 23rd Conference of Applied Physics (1962). Based on the theory of aberration, this method is aimed at eliminating eccentric aberrations which occur when a movable lens unit in an optical system having an arbitrary refractive power arrangement is moved in the direction perpendicular to the optical axis to prevent an image from becoming blurred.

As expressed by the following formula (a), the amount $\Delta Y1$ of aberration of the whole optical system caused by a translational decentering of a lens unit P of the optical system by an amount E is the sum of the amount $\Delta Y$ of aberration before the decentering and the amount $\Delta Y(E)$ of aberration caused by the decentering. The amount $\Delta Y$ is expressed in the following formula (b) in terms of the spherical aberration (I), coma aberration (II), astigmatism (III), Petzval sum (P) and distortion (Y). The eccentricity aberration $\Delta Y(E)$ is expressed, as given by the following formula (c), in terms of the primary eccentricity coma aberration (IIE), primary eccentricity astigmatism (IIIE), primary eccentric field curvature (PE), primary eccentricity distortion (VE1), primary eccentricity distortion additional aberration (VE2) and primary origin movement ($\Delta E$).

From the formula (d), it is understood that, in an optical system in which a lens group P is translationally decentered, the aberrations ($\Delta E$) to (VE2) of the formula (i) can be expressed by using aberration coefficients Ip, IIp, IIIp, Pp and Vp of the lens unit P and aberration coefficients Iq, IIq, IIIq, Pq and Vq of an imaginary lens group q which is constituted by all the lens units positioned between the lens unit P and the image plane, with the angles of incidence of light to the lens unit P expressed by $\alpha_p$ and $\alpha a_p$.

$$\Delta Y1 = \Delta Y + \Delta Y(E) \quad \text{(a)}$$

$$\Delta Y = -(1/2\alpha_{k'})[(N_1\tan\omega)^3\cos\phi\omega \cdot V + \quad \text{(b)}$$
$$(N_1\tan\omega)^2 R\{2\cos\phi\omega\cos(\phi_R - \phi\omega) \cdot III +$$
$$\cos\phi_R(III + P)\} + (N_1\tan\omega)R^2\{2\cos\phi_R\cos(\phi_R - \phi\omega) +$$
$$\cos\phi\omega\} \cdot II + R^3\cos\phi \cdot I]$$

$$\Delta Y(E) = -(E/2\alpha_{k'})[(N_1\tan\omega)^2\{(2 + \cos2\phi\omega)(VE1) - (VE2)\} + \quad \text{(c)}$$
$$2(N_1\tan\omega)R[\{\cos(\phi_R - \phi\omega) +$$
$$\cos(\phi_R + \phi\omega)\}(IIIE) + \cos\phi_R\cos\phi\omega \cdot (PE)] +$$
$$R^2(2 + \cos^2\phi_R)(IIE)] - (E/2\alpha_{k'})(\Delta E)$$

$$(\Delta E) = -2(\alpha'_p - \alpha_p) = -2h_p\phi_p \quad \text{(d)}$$

$$(IIE) = \alpha'_p II_q - \alpha_p(II_p + II_q) - \alpha\alpha'_p I_q + \alpha\alpha_p(I_p + I_q) \quad \text{(e)}$$
$$= h_p\phi_p II_q - \alpha_p II_p - (ha_p\phi_p I_q - \alpha a_p I_p)$$

$$(IIIE) = \alpha'_p III_q - \alpha_p(III_p + III_q) - \alpha\alpha'_p II_q + \alpha\alpha_p(II_p + II_q) \quad \text{(f)}$$
$$= h_p\phi_p III_q - \alpha_p III_p - (ha_p\phi_p II_q - \alpha a_p II_p)$$

$$(PE) = \alpha'_p P_q - \alpha_p(P_p + P_q) = h_p\phi_p P_q - \alpha_p P_p \quad \text{(g)}$$

$$(VE1) = \alpha'_p V_q - \alpha_p(V_p + V_q) - \alpha\alpha'_p III_q + \alpha\alpha_p(III_p + III_q) \quad \text{(h)}$$
$$= h_p\phi_p V_q - \alpha_p V_p - (ha_p\phi_p III_q - \alpha a_p III_p)$$

$$(VE2) = \alpha a_p P_q - \alpha a_p(P_p + P_q) = ha_p\phi_p P_q - \alpha a_p P_p \quad \text{(i)}$$

From these formulae, it is understood that suppression of eccentricity aberrations requires that the aberration coefficients $I_p$, $II_p$, $III_p$, $P_p$ And $V_p$ of the lens unit P are set t small values or that the lenses are arranged in good balance such that the coefficients are canceled by each other as shown by the formulae (a) to (i).

A description will now be given of the optical operation of the optical system of the invention having the anti-vibration function, with reference to a model of an anti-vibration optical system of the type of the type shown in FIG. 9, in which a lens unit is decentered in the direction perpendicular to the optical axis so as to compensate for displacement of the picked-up image.

In order to realize a sufficiently large amount of compensation for image displacement with a sufficiently small amount of decentering, it is necessary that the amount ($\Delta E$) of the primary origin movement is set to a sufficiently large value. Conditions for compensating for the primary eccentricity field curvature (PE) will be considered based on this knowledge.

The optical system shown in FIG. 9 has three lens units: a lens unit o closest to the object, an intermediate lens unit p and a lens unit q closest to the image plane, among which the lens unit p is translationally movable in the direction perpendicular to the optical axis so as to effect vibration compensation thereby eliminating blur of the image.

For application in the formulae shown above, the values of the refractive power of the lens units o, p and q are respectively represented by $\Phi_o$, $\Phi_p$ and $\Phi_q$. Angles of incidence of the paraxial light ray and extra-axial light ray are respectively represented by $\alpha$ and $\alpha a$, while the heights of incidence of these light rays are respectively represented by h and ha. Suffixes o, p and q indicative of the lens groups are attached to these factors $\alpha$, $\alpha a$, h and ha, as well as to aberration coefficients. It is assumed that each lens unit is composed of few lenses and that the aberration coefficients exhibit tendencies of insufficiency of correction.

A discussion will now be given on Petzval sums of the lens units. Petzval sums Po, Pp and Pq of the lens units are proportional to the values $\Phi_o$, $\Phi_p$ and $\Phi_q$ of refractive power of the respective lens units. More specifically, the following conditions are roughly met:

$$Po = C\Phi_o$$

$$Pp = C\Phi_p$$

$$Pq = C\Phi_q$$

where C represents a constant

Substituting the conditions shown above, the primary eccentricity field curvature (PE) generated as a result of the translational decentering of the lens unit p can be transformed as follows:

$$(PE) = C\Phi_p(h_p\Phi_q - \alpha_p)$$

Therefore, in order to effect a correction against the eccentricity field curvature (PE), it is necessary that either a condition $\Phi_p = 0$ or a condition $\Phi_q = \alpha_p/h_p$ is met. If the first condition, i.e., $\Phi_p = 0$, is adopted, compensation for image displacement cannot be performed, because the primary origin movement ($\Delta E$) is zero under such a condition. It is therefore necessary to determine the solution which satisfies the other condition: namely, $\Phi_q = \alpha_p/h_p$. This means that $\alpha_p$ and $\Phi_q$ are of the same sign, e.g., plus or minus, since $h_p$ is greater than 0 (plus).

a) When $\alpha_p$ is greater than 0 ($\alpha_p > 0$):

In order to effect correction against eccentricity field curvature, $\Phi_q$ should be greater than 0 ($\Phi_q > 0$) and $\Phi_o > 0$ is essentially met. In this case, if the condition of $\Phi_p > 0$ is also satisfied, $\alpha_p$ and $\alpha'_p$ satisfy the condition of $0 < \alpha_p < \alpha'_p < 1$, and the primary origin point movement ($\Delta E$) is expressed by $$(\Delta E) = -2(\alpha'_p - \alpha_p) > -2$$

Thus, the decentering sensitivity, which is the ratio of the amount of displacement of the picked-up image to the unit amount of displacement of the decentering lens unit, takes a value which is smaller than 1. In addition, as stated before, the decentering sensitivity is zero when the condition of $\Phi_p = 0$ is met. In this case, therefore, $\Phi_p$ must be determined to meet the condition of $\Phi_p < 0$.

b) When $\alpha_p$ is smaller than 0 ($\alpha_p < 0$):

In order to effect correction against eccentricity field curvature (PE), $\Phi_q$ should be smaller than 0 ($\Phi_q < 0$) and $\Phi_o < 0$ is essentially met. In this case, therefore, the condition of $\Phi_p > 0$ is essentially met.

From the foregoing discussion, it is understood that refractive power arrangements a and b as shown in the following Table 1 are suitably used in the optical system, in order that the optical system can effect correction against the primary eccentricity field curvature, while obtaining a sufficiently large value of the primary origin point movement ($\Delta E$).

TABLE 1

| Lens unit | | o | p | q |
|---|---|---|---|---|
| Refractive power | a | Positive | Negative | Positive |
| | b | Negative | Positive | Negative |

These refractive power arrangements are illustrated in FIGS. 10A and 10B.

The present invention is based on these refractive power arrangements. A description will now be given as to the features of the lens arrangement in accordance with the present invention. In general, an optical system is designed in such a way as to enable effective corrections against various types of aberrations with a compact lens arrangement, by suitably determining the refractive power of the lens units. When the optical system is designed such that a selected lens unit of the optical system is translationally decentered in the direction perpendicular to the optical axis so as to compensate for the displacement of picked-up image, it is advisable that the lens unit to be decentered is selected so as to attain a sufficiently large decentering sensitivity, as well as ease of correction against eccentricity aberrations.

Meanwhile, in order to achieve a compact construction of the optical system and, hence, of the apparatus employing such an optical system, it is desirable that a lens unit having comparatively small outside dimensions is selected as the lens unit to be decentered.

From these points of view, the optical system which achieves the present invention adopts the refractive power arrangement which is shown in FIG. 10A.

Thus, the optical system in accordance with the present invention has a first lens unit which is closest to the object and which has positive refractive power, an intermediate second lens unit which has negative refractive power, and a third lens unit which is most remote from the object and which has positive refractive power. The second lens unit is movable along the optical axis to perform focusing, while the first and the third lens units are kept stationary. The third lens unit includes (a) a front lens sub-unit closer to the object and having negative refractive power and (b) a rear lens sub-unit more remote from the object and having positive refractive power, the front lens sub-unit being movable in the direction perpendicular to the optical axis so as to compensate for vibration of the picked-up image caused by vibration of the optical system, thereby preventing the image from blurring.

In the illustrated embodiment of the invention, the second lens unit is used for focal adjustment so that the normalized tilt angles of the paraxial light impinging upon the front lens sub-unit and the paraxial light emitted from the front lens sub-unit are maintained to be substantially constant, thereby minimizing variation in the eccentricity aberrations caused by the focusing operation.

Numerical examples of the embodiment of the present invention are shown below, in which: Ri represents the radius of curvature of the i-th lens surface as counted from the end adjacent to the object, Di represents the i-th lens thickness and spatial distance as counted from the end adjacent to the object, and Ni and vi respectively represent the refractive index and Abbe number of the i-th lens as counted from the end adjacent to the object. The values of the aforesaid conditional equations, as calculated based on the numerical values of the respective numerical examples, are shown in Table 2.

Representing the values such as the focal length by mm (millimeter), the first and second numerical examples are based on an assumption that the front lens sub-unit is movable substantially in the vertical direction along an imaginary spherical surface centered at a point on the optical axis about 400 mm apart rearward, i.e., towards the image plane, from the third lens unit.

The third numerical example is based on an assumption that the front lens sub-unit is moved along an imaginary spherical surface centered at infinity, i.e., that the front lens sub-unit is decentered translationally. In the fourth numerical example, the front lens sub-unit is assumed to move along an imaginary spherical surface centered at a point on the optical axis about 200 mm apart rearward, i.e., towards the image plane, from the third lens unit.

<Numerical Example 1> f = 133.82    Fno = 1:2.9    2ω = 18.37°

| | | | |
|---|---|---|---|
| R 1 = 78.98 | D 1 = 6.0 | N 1 = 1.51633 | ν 1 = 64.2 |
| R 2 = 7666.28 | D 2 = 0.2 | | |
| R 3 = 68.62 | D 3 = 5.5 | N 2 = 1.51633 | ν 2 = 64.2 |
| R 4 = 606.30 | D 4 = 0.2 | | |
| R 5 = 61.94 | D 5 = 8.0 | N 3 = 1.51633 | ν 3 = 64.2 |
| R 6 = −420.18 | D 6 = 2.0 | N 4 = 1.80518 | ν 4 = 25.4 |
| R 7 = 81.18 | D 7 = 20.0 | | |
| R 8 = 307.55 | D 8 = 3.0 | N 5 = 1.80518 | ν 5 = 25.4 |
| R 9 = −114.08 | D 9 = 1.5 | N 6 = 1.77250 | ν 6 = 49.6 |
| R10 = 49.90 | D10 = 13.0 | | |
| R11 = 272.59 | D11 = 3.0 | N 7 = 1.76182 | ν 7 = 26.5 |
| R12 = −40.50 | D12 = 1.3 | N 8 = 1.51742 | ν 8 = 52.4 |
| R13 = 64.23 | D13 = 1.5 | | |
| R14 = −119.76 | D14 = 1.3 | N 9 = 1.77250 | ν 9 = 49.6 |
| R15 = 46.25 | D15 = 4.0 | | |
| R16 = 99.04 | D16 = 3.0 | N10 = 1.77250 | ν10 = 49.6 |
| R17 = −126.36 | D17 = 0.2 | | |
| R18 = 59.37 | D18 = 5.0 | N11 = 1.77250 | ν11 = 49.6 |
| R19 = −42.57 | D19 = 1.3 | N12 = 1.80518 | ν12 = 25.4 |
| R20 = 736.42 | | | |
| Back focus 50.680 | | | |

<Numerical Example 2> f = 134.33    Fno = 1:2.9    2ω = 18.30°

| | | | |
|---|---|---|---|
| R 1 = 72.34 | D 1 = 7.0 | N 1 = 1.51633 | ν 1 = 64.2 |
| R 2 = −2378.61 | D 2 = 0.2 | | |
| R 3 = 61.33 | D 3 = 6.0 | N 2 = 1.51633 | ν 2 = 64.2 |
| R 4 = 345.87 | D 4 = 0.2 | | |
| R 5 = 62.48 | D 5 = 7.0 | N 3 = 1.51633 | ν 3 = 64.2 |
| R 6 = −381.13 | D 6 = 2.0 | N 4 = 1.80518 | ν 4 = 25.4 |
| R 7 = 78.31 | D 7 = 20.0 | | |
| R 8 = 358.77 | D 8 = 3.0 | N 5 = 1.80518 | ν 5 = 25.4 |
| R 9 = −55.17 | D 9 = 1.3 | N 6 = 1.77250 | ν 6 = 49.6 |
| R10 = 43.22 | D10 = 13.0 | | |
| R11 = −72.44 | D11 = 2.5 | N 7 = 1.76182 | ν 7 = 26.5 |
| R12 = −41.42 | D12 = 2.0 | | |
| R13 = −55.26 | D13 = 1.2 | N 8 = 1.77250 | ν 8 = 49.6 |
| R14 = 47.27 | D14 = 5.0 | | |
| R15 = 104.24 | D15 = 3.0 | N 9 = 1.77250 | ν 9 = 49.6 |
| R16 = −115.90 | D16 = 0.2 | | |
| R17 = 59.56 | D17 = 5.0 | N10 = 1.77250 | ν10 = 49.6 |
| R18 = −61.25 | D18 = 1.4 | N11 = 1.80518 | ν11 = 25.4 |
| R19 = 817.71 | | | |
| Back focus 50.153 | | | |

<Numerical Example 3> f = 134.40    Fno = 1:2.9    2ω = 18.29°

| | | | |
|---|---|---|---|
| R 1 = 73.37 | D 1 = 7.5 | N 1 = 1.51633 | ν 1 = 64.2 |
| R 2 = −222.89 | D 2 = 0.2 | | |
| R 3 = 61.87 | D 3 = 6.0 | N 2 = 1.51633 | ν 2 = 64.2 |
| R 4 = 909.30 | D 4 = 1.5 | | |
| R 5 = −315.45 | D 5 = 2.0 | N 3 = 1.80518 | ν 3 = 25.4 |
| R 6 = 91.94 | D 6 = 0.2 | | |
| R 7 = 61.86 | D 7 = 4.5 | N 4 = 1.51633 | ν 4 = 64.2 |
| R 8 = 354.65 | D 8 = 20.0 | | |
| R 9 = 236.29 | D 9 = 3.0 | N 5 = 1.80518 | ν 5 = 25.4 |
| R10 = −72.50 | D10 = 1.5 | N 6 = 1.77250 | ν 6 = 49.6 |
| R11 = 43.00 | D11 = 13.0 | | |
| R12 = 235.58 | D12 = 3.5 | N 7 = 1.76182 | ν 7 = 26.5 |
| R13 = −36.42 | D13 = 1.3 | N 8 = 1.51742 | ν 8 = 52.4 |
| R14 = 68.66 | D14 = 1.5 | | |
| R15 = −91.17 | D15 = 1.3 | N 9 = 1.77250 | ν 9 = 49.6 |
| R16 = 46.32 | D16 = 3.0 | | |
| R17 = 124.54 | D17 = 3.0 | N10 = 1.77250 | ν10 = 49.6 |
| R18 = −105.77 | D18 = 0.2 | | |

-continued

| | | | |
|---|---|---|---|
| R19 = 53.64 | D19 = 5.5 | N11 = 1.77250 | ν11 = 49.6 |
| R20 = −33.65 | D20 = 1.3 | N12 = 1.80518 | ν12 = 25.4 |
| R21 = 500.80 | | | |
| Back focus 50.299 | | | |

<Numerical Example 4> f = 134.45    Fno = 1:2.9    2ω = 18.28°

| | | | |
|---|---|---|---|
| R 1 = 62.44 | D 1 = 7.0 | N 1 = 1.60311 | ν 1 = 60.7 |
| R 2 = −481.91 | D 2 = 0.2 | | |
| R 3 = 53.62 | D 3 = 6.5 | N 2 = 1.60311 | ν 2 = 60.7 |
| R 4 = −630.77 | D 4 = 1.5 | | |
| R 5 = −274.49 | D 5 = 2.0 | N 3 = 1.80518 | ν 3 = 25.4 |
| R 6 = 85.53 | D 6 = 20.0 | | |
| R 7 = 80.43 | D 7 = 3.0 | N 4 = 1.60342 | ν 4 = 38.0 |
| R 8 = 289.23 | D 8 = 1.5 | N 5 = 1.77250 | ν 5 = 49.6 |
| R 9 = 36.78 | D 9 = 13.0 | | |
| R10 = 68.99 | D10 = 3.5 | N 6 = 1.76182 | ν 6 = 26.5 |
| R11 = −42.67 | D11 = 1.3 | N 7 = 1.60311 | ν 7 = 60.7 |
| R12 = 29.10 | D12 = 3.0 | | |
| R13 = −53.18 | D13 = 1.3 | N 8 = 1.77250 | ν 8 = 49.6 |
| R14 = 220.20 | D14 = 3.0 | | |
| R15 = 91.48 | D15 = 3.5 | N 9 = 1.77250 | ν 9 = 49.6 |
| R16 = −89.23 | D16 = 0.2 | | |
| R17 = 57.57 | D17 = 6.0 | N10 = 1.60311 | ν10 = 60.7 |
| R18 = −34.49 | D18 = 1.5 | N11 = 1.80518 | ν11 = 25.4 |
| R19 = −182.92 | | | |
| Back focus 50.345 | | | |

TABLE 2

| | Numerical Examples | | | |
|---|---|---|---|---|
| Conditions | 1 | 2 | 3 | 4 |
| (1) f1/f | 0.61 | 0.57 | 0.57 | 0.60 |
| (2) \|f2/f\| | 0.60 | 0.50 | 0.53 | 0.60 |
| (3) f3/f | 1.38 | 1.11 | 1.49 | 1.41 |
| (4) \|f3a/f\| | 0.34 | 0.34 | 0.33 | 0.32 |
| (5) Da/f | 0.28 | 0.28 | 0.28 | 0.28 |

As will be understood from the foregoing description, according to the present invention, there is provided an image stabilizing optical device of the type in which a selected lens unit of the optical system is driven and decentered in the direction perpendicular to the optical axis so as to effect correction against displacement of a picked-up image, thereby eliminating blur of the image, wherein the lens elements are appropriately arranged so as to enable effective correction against various kinds of eccentricity aberrations and so as to achieve a large amount of correction against displacement of the picked-up image with a sufficiently small amount of decentering driving. According to the present invention, it is thus possible to obtain an optical lens device having an anti-vibration function for stabilizing an image, which is suitable for use as an inner-focus-type medium-telephoto image pickup optical system.

What is claimed is:

1. A single focal length lens system comprising, in order from an object side to an image side of said lens system:
    a first lens unit having positive power which does not move for focusing, said first lens unit comprising three positive lens elements and a negative lens element;
    a second lens unit having negative power which moves for focusing; and
    a third lens unit having positive power which does not move for focusing, said third lens unit comprising, in order from the image side to the object side, a first lens sub-unit having positive power and a second lens sub-unit having negative power, wherein an image formed by said lens system is displaced by moving said second lens sub-unit in a direction which has a component perpendicular to the optical axis, wherein said first lens sub-unit comprises two positive lens elements and a negative lens element, and wherein said second lens sub-unit comprises at least one positive lens element and at least one negative lens element.

2. A lens system according to claim 1, wherein the following condition is satisfied:

$$0.15<|f3a/f|<0.5$$

where f3a is a focal length of said second lens sub-unit, and f is an overall focal length of said lens system as a whole.

3. A lens system according to claim 1, wherein the following condition is satisfied:

$$0.15<Da/f<0.5$$

where Da is a distance between the surface of said first lens unit closest to the image side and the surface of said third lens unit closest to the object side, and f is an overall focal length of said lens system as a whole.

4. A lens system according to claim 1, wherein the following condition is satisfied:

$$0.4<f1/f<0.8$$

where f1 is a focal length of said first lens unit, and f is an overall focal length of said lens system as a whole.

5. A lens system according to claim 1, wherein the following condition is satisfied:

$$0.4<f2/f|<0.8$$

where f2 is a focal length of said second lens unit, and f is an overall focal length of said lens system as a whole.

6. A lens system according to claim 1, wherein the following condition is satisfied:

$$0.8<f3/f<5.0$$

where f3 is a focal length of said third lens unit, and f is an overall focal length of said lens system as a whole.

7. A single focal length lens system comprising, in order from an object side to an image lens system:

a first lens unit having positive power which does not move for focusing, said first lens unit comprising three positive lens elements and a negative lens element;

a second lens unit having negative power which moves for focusing; and a third lens unit which does not move for focusing, said third lens unit comprising, in order from the image side to the object side, a first lens sub-unit having positive power and a second lens sub-unit having negative power, wherein an image formed by said lens system is displaced by moving said second lens sub-unit in a direction which has a component perpendicular to the optical axis, wherein said first lens sub-unit comprises two positive lens elements and a negative lens element, and wherein said second lens sub-unit comprises at least one positive lens element and at least one negative lens element.

* * * * *

UNITED STATES PATENT AND TRADEMARK OFFICE
CERTIFICATE OF CORRECTION

PATENT NO. : 6,728,033 B2
DATED : April 27, 2004
INVENTOR(S) : Shingo Hayakawa

It is certified that error appears in the above-identified patent and that said Letters Patent is hereby corrected as shown below:

Column 5,
Line 6, "to" should be deleted.
Line 53, "comma" should read -- coma --.

Column 7,
Line 46, "ratio" should read -- the ratio --.

Column 8,
Line 57, "met" should read -- meet --.

Column 11,
Line 9, "constant" should read -- constant. --.

Column 16,
Line 1, "f2/f|" should read -- |f2/f| --.

Signed and Sealed this

Tenth Day of August, 2004

JON W. DUDAS
*Acting Director of the United States Patent and Trademark Office*